United States Patent Office 3,108,879
Patented Oct. 29, 1963

3,108,879
PREPARATION OF AN IMPROVED BLUE CHEESE DRESSING
Burdet Heinemann, Springfield, Mo., assignor to Producers Creamery Company, Springfield, Mo., a corporation of Missouri
No Drawing. Filed July 31, 1961, Ser. No. 127,869
3 Claims. (Cl. 99—116)

This invention relates to the manufacture of salad dressing containing blue cheese of the roquefort type. This invention also relates to the preparation of viable mycelial pellets of *Penicillium roqueforti*.

No single process is followed by all makers of blue cheese, but the method described here incorporates the essential features of most. Raw or pasteurized whole milk at about 30° C. (86° F.) is inoculated with 2 to 3% of *Streptococcus lactis*-type starter. The milk is ripened until the acidity increases by 0.03 to 0.05%. Rennet is added, and the curd is cut when it becomes firm and "porcelain-like" (usually 60 to 90 minutes). As soon as the curd particles reach the desired firmness the whey is removed. Usually the curd also is inoculated with spores of *Penicillium roqueforti* at this time, although some makers adds the spores to the milk before curdling or even mix the spores with the curd while the hoops are being filled. The curd is scooped into round metal hoops about 7 inches in diameter. These are placed on a draining table without pressure and turned at intervals to facilitate the drainage and to promote uniform matting. The temperature should be about 20° C. (68° F.).

On the following day the fresh cheese is removed from the hoops and salted in a cold room. After the surface has dried for 2 or 3 days, the cheese may be dipped in paraffin; then it is punctured with long, slender needles to admit air and favor growth of the mold. The cheese is stored on edge in rooms or caves maintained at 9° to 12° C. (48.2° to 53.6° F.) and 95 to 98% relative humidity. When the cheese is about 3 months old it is cleaned, wrapped in foil, and stored at 7° C. (44.6° F.) or below until the desired flavor and body characteristics are attained. This may require several months.

In the past, mold spores used to inoculate blue cheese have been obtained by growing *Penicilluim roqueforti* on cubes of sterile whole wheat bread. Only cultures of proven suitability are used for this purpose. After growth and sporulation are well advanced, the bread is dried and powdered. Usually 2 to 4 grams of this powder per 1000 pounds of milk or 0.1 to 0.2 gram per 5-pound cheese is sufficient.

In the manufacture of salad dressing containing blue cheese of the roquefort type, a problem is usually encountered in preservation of the native appearance of the finished dressing. During preparation, blue cheese manufactured as described above is broken up and mixed with the finished dressing. As served in homes and restaurants, the cheese is usually in chunks or pieces up to ¼ inch in size and the particles of blue mold are readily apparent, thereby serving to identify the dressing as a blue cheese or roquefort cheese dressing along with the characteristic flavor. Attempts to duplicate this appearance commercially, however, have not been successful since the preparation of commercial size batches requires pumping and excessive agitation which breaks up the identifying blue mycelial pellets to a point where their identity disappears.

It is therefore an object of this invention to provide a blue cheese salad dressing containing its characteristic appearance even after severe agitation.

It is another object of this invention to provide an improved method for growth of *Penicillium roqueforti* mycelial pellets.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by growing mycelial pellets of *Penicillium roqueforti* by submerged culture technqiues. The growth of pellets is separated from the nutrient medium and may be dried intact. The dried pellets may be added to a blue cheese salad dressing at the completion of the mixing process, thereby restoring an attractive and identifying appearance.

The cultured, dried mycelial pellets of *Penicillium roqueforti* are added to the finished dressing in an amount of from about 0.005 to about 0.2% by weight. In many instances, the incorporation of 0.1% by weight of the dried pellets will restore the salad dressing to its original appearance. The pellets are added, after complete blending of the dressing, with only sufficient agitation to distribute the pellets uniformly.

It has further been found that mycelial pellets of *Penicillium roqueforti* may be conveniently produced by submerged culture techniques under aerobic conditions. The submerged culture process involves the growth of the Penicillium mold in an aqueous nutrient medium and accompanied customarily by agitation. When the submerged culture process is carried out in small vessels, such as flasks of relatively small capacity, the process is frequently referred to as the "shake" culture process because the agitation is produced by continuously shaking the culture by suitable mechanical means. When containers of larger capacity are employed, agitation of the liquid nutrient medium is ordinarily accomplished in part by mechanical stirring and in part by aeration, the latter functioning primarily to supply oxygen for growth of the mold.

In the production of mycelial pellets of *Penicillium roqueforti*, a suitable aqueous nutrient medium is inoculated with spores or viable mycelium and then continuously agitated in the presence of air for a period of more than 12 hours. The mycelial growth is harvested and then subjected to freeze drying, thereby maintaining the mycelium in a viable state.

The *Penicillium roqueforti* mycelium may be cultured in many different media. Essentially, the medium must contain, in water, a carbohydrate as a source of energy, a source of nitrogen, either organic or inorganic, and a source of essential mineral nutrients. A typical medium which has been found to be particularly suitable is as follows.

TABLE 1

| Ingredient: | Grams per liter |
|---|---|
| Dextrose | 25.0 |
| Milk protein hydrolysate [1] | 2.0 |
| Ammonium phosphate | 3.5 |
| Calcium carbonate | 2.0 |
| Silicon AF antifoam [2] | 1.0 |
| Potassium sulfate | 1.0 |
| Potassium sulfate | 1.5 |
| Ferrous sulfate | .002 |
| Manganous sulfate | .001 |
| Water to 1000 ml. | |

[1] Pancreatic digest of casein.
[2] Dow Corning Corp., Midland, Mich.

In the following example and throughout the specification and claims all parts are parts by weight unless otherwise specified.

Example 1

A typical formula and method of preparation for a blue cheese dressing under the teachings of this invention are as follows.

MIX A

| Ingredient: | Amount |
|---|---|
| Water _____ pounds__ | 16.5 |
| Vinegar (5%) _____ do____ | 10.0 |
| Starch _____ do____ | 3.5 |
| Blue cheese _____ do____ | 12.5 |

MIX B

| Ingredient: | Amount |
|---|---|
| Dried egg yolk _____ pounds__ | 1.5 |
| Salt _____ do____ | 1.0 |
| Cottonseed oil _____ do____ | 10.0 |
| Tween 80 _____ do____ | .25 |
| Vinegar _____ do____ | 4.0 |
| Water _____ do____ | 1.0 |
| Chondrus extract _____ ounce__ | 1 |

MIX C 0.5 ounce dried mycelial pellets of *Penicillium roqueforti*.

The ingredients in Mix A are blended together at a temperature of about 60° F. and pasteurized at 180° F. for a time sufficient to cook the starch and thereafter promptly cooled. The ingredients in Mix B are homogenized to form a stable emulsion and then blended with Mix A. When blending is complete, Mix C is added with only sufficient agitation to distribute the pellets uniformly.

While Example 1 above describes the preparation of a particular blue cheese salad dressing, the method of this invention may be used in a variety of such dressings as are well known in the art.

What is claimed is:

1. In a method for the production of a blue cheese type salad dressing, the improvement comprising adding to a prepared fluid roquefort type dressing having a blue cheese flavor, dried, cultured mycelial pellets of *Penicillium roqueforti*.

2. The method according to claim 1 wherein the pellets are added in an amount of from about 0.001 to about 0.2% by weight.

3. The method according to claim 1 wherein the pellets are added in an amount of about 0.1% by weight.

References Cited in the file of this patent

UNITED STATES PATENTS 2,872,324    Locatelli _____ Feb. 3, 1959

OTHER REFERENCES

Raper et al.: A Manual of the Penicillia, published by The Williams and Wilkins Co., Baltimore, 1949, pages 392–399. (Copy in Division 63.)

Jorgensen et al.: Microorganisms and Fermentations, Charles Griffin & Company, Limited, London, 1948, pages 172, 173 and 200–202. (Copy in Division 63.)